United States Patent

[11] 3,597,849

| [72] | Inventor | Andrew E. Gaal |
| | | Monroeville, Pa. |
| [21] | Appl. No. | 849,420 |
| [22] | Filed | Aug. 12, 1969 |
| [45] | Patented | Aug. 10, 1971 |
| [73] | Assignee | The United States of America as represented by the United States Atomic Energy Commission |

[54] PERIPHERAL SCANNING SYSTEM
4 Claims, 10 Drawing Figs.

| [52] | U.S. Cl. | 33/174 PB |
| [51] | Int. Cl. | G01b 5/20 |
| [50] | Field of Search | 33/174 L, 174 P, 174 PA, 174 PB |

[56] References Cited
UNITED STATES PATENTS

| 3,311,233 | 3/1967 | Helmbrecht | 33/174 P X |
| 3,481,043 | 12/1969 | Esch | 33/174 P |
| 3,501,841 | 3/1970 | Adams | 33/174 P |

Primary Examiner—Leonard Forman
Assistant Examiner—Dennis A. Dearing
Attorney—Roland A. Anderson

ABSTRACT: A peripheral scanning system for measuring the surface shape of a rod. A pair of needlelike probes are maintained in contact with the outer surface of the rod while a mechanism is employed to maintain contact with the probes as the latter are moved transversely. Thus the probes are forced to retract to accommodate changes in surface shape. Transducers are utilized to report the positions of the probes continuously. A swing arm arrangement interconnects the probes for simultaneous movement.

Patented Aug. 10, 1971

INVENTOR.
ANDREW E. GAAL
BY

Patented Aug. 10, 1971 3,597,849

INVENTOR.
ANDREW E. GAAL
BY

Patented Aug. 10, 1971

INVENTOR.
ANDREW E. GAAL
BY

INVENTOR.
ANDREW E. GAAL

3,597,849

PERIPHERAL SCANNING SYSTEM

BACKGROUND OF THE INVENTION

The invention described herein was made in the course of, or under a contract with the United States Atomic Energy Commission.

In a nuclear reactor utilizing extended fuel rods which are assembled into the core, the spaces between and through the rods are generally utilized for the flow of coolant. The sizes of the passageways are critical since it is desirable to maintain uniform temperatures throughout and the reduction of flow of coolant at a particular location could result in localized excessive temperatures or hot spots.

For this reason, when fuel rods are constructed it is necessary to insure that surface irregularities, bowings, and other distortions in shape are not present. In the case of cylindrically shaped rods, V-blocks and mechanical or optical depth gauges have long been used to determine whether the cylindrical shape was desired.

However, the difficulty is not merely in obtaining dimensions but also in detecting the extent of bow and other surfaces irregularities to which the mentioned techniques could not readily be adapted.

SUMMARY OF THE INVENTION

The present invention makes it possible to determine the diameter, ovality, bow, and surface contour of cylindrical members with relative simplicity and a degree of accuracy not heretofore obtainable. In accordance with this invention the extended cylindrical member is supported adjacent the ends thereof and a scanning system referred to herein as a profilometer employing point contact is utilized to generate signals which can be recorded on magnetic tapes, chart recorders, and the like. A pair of scanning needles or probes are moved around the cylindrical member while maintaining point contact in a plane perpendicular to the axis of the member. The scanning needles are moved axially to repeat the scanning cycle at steps along the member.

It is thus a principal object of this invention to provide for measurement of diameter, ovality, bow and surface contour conditions of cylindrical members.

Other objects and advantages of this invention will hereinafter become apparent from the following description of a preferred embodiment of this invention.

DESCRIPTION OF THE PREFERRED EMBODIMENT

Figure 1:
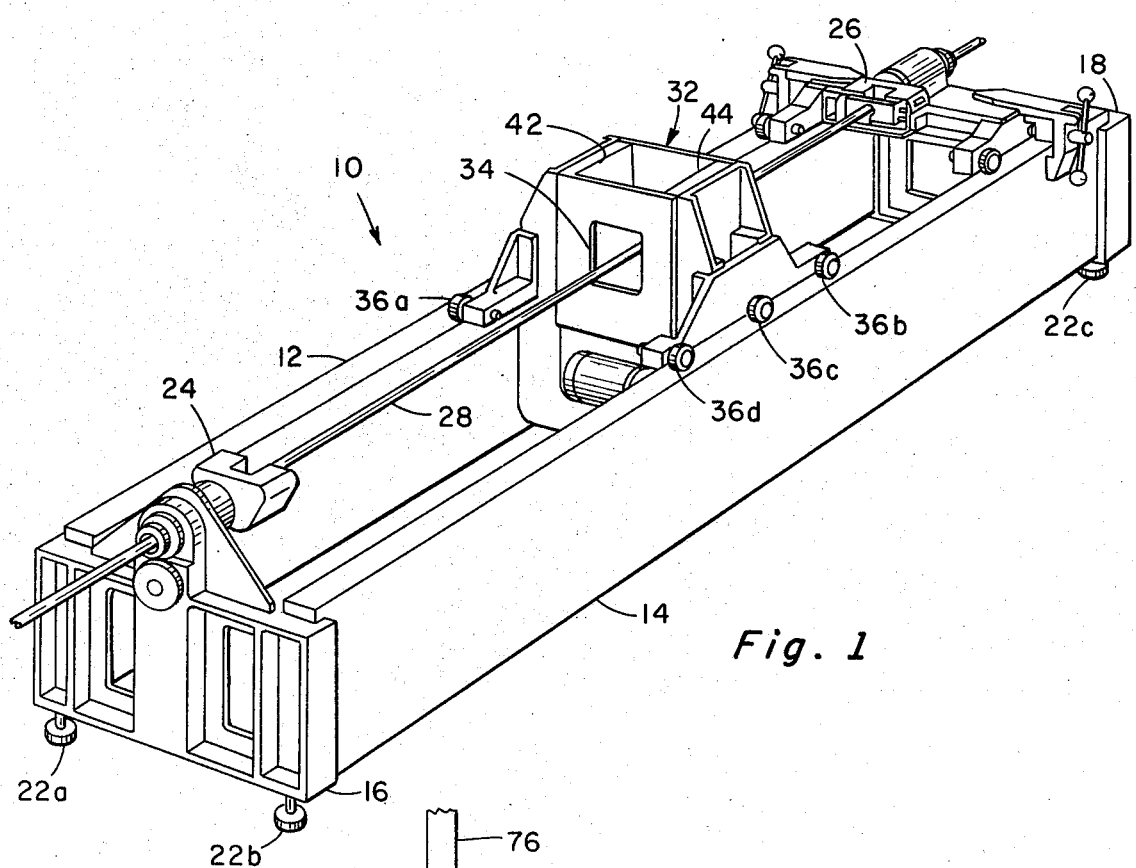
FIG. 1 is an isometric view of a preferred embodiment of this invention.

Referring to FIG. 1, profilometer 10 consists of a pair of spaced stationary extended track members 12 and 14 supported on stands 16 and 18. Levellers 22a, 22b, 22c, and a fourth not shown are utilized to level the device properly. A pair of centering heads 24 and 26 support the ends of cylindrical rod 28 whose surface contour, diameter, bow and ovality are to be measured. Spanning track members 12 and 14, a carriage 32 having an opening 34 through which rod 28 freely passes is slideable on wheels 36a, 36b, 36c, 36d and others not shown, along the length of tracks 12 and 14. Within carriage 32 is mounted the scanning assembly to be described.

Figure 2:
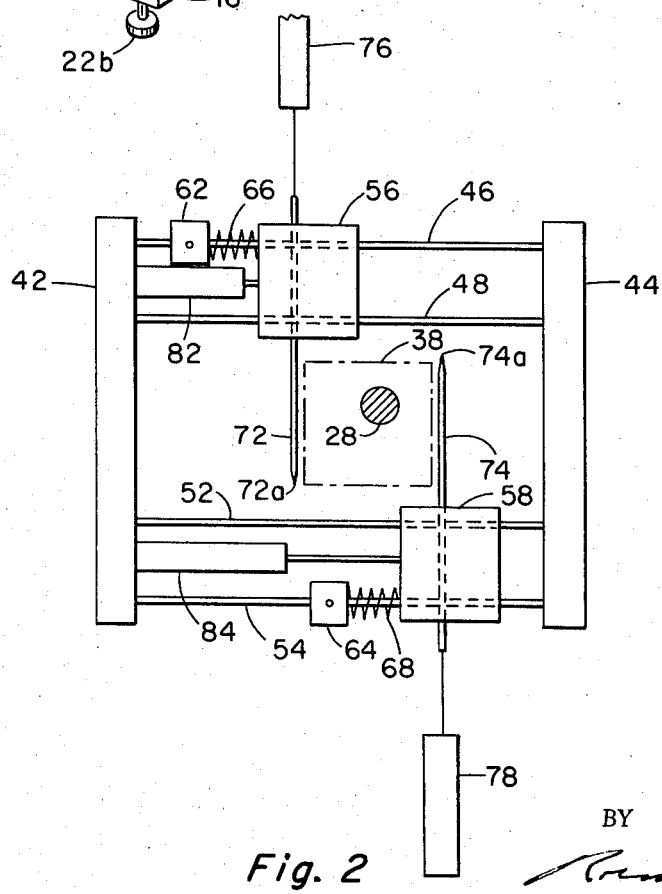
FIGS. 2 and 3a—3f show schematically the functional features of this invention.

Reference is made to FIGS. 2, and 3a—3f for a brief review of the operation of the scanning elements. As seen in FIG. 2, cylindrical rod 28 is located somewhere within the space limited by box 38 shown in phantom representing the limit of usefulness of the apparatus. End plates 42 and 44 which are attached to the sidewalls of carriage 32 support the ends of two sets of parallel shafts 46, 48, and 52, 54. A slide 56 moves freely on shafts 46 and 48 while a slide 58 rides similarly on shafts 52 and 54.

A pair of bushings 62 and 64 ride on shafts 46 and 54, respectively, connected respectively by helical springs 66 and 68 to slides 56 and 58, as shown.

A pair of vertically extending scanning needles 72 and 74 with tips 72a and 74a, respectively, extending through slides 56 and 58, respectively, are supported in a manner not shown, on opposite sides of rod 28 in a plane perpendicular to the axis of the latter. Needles 72 and 74 are connected to suitable transducers 76 and 78, respectively, such as linear potentiometers while slides 56 and 58 are connected to transducers 82 and 84, respectively. Transducers 76, 78, 82, and 84 provide suitable signals useful on a strip recorder, for example, as to the position of the movable members attached respectively thereto which in turn show the positions of needles 72 and 74. That is, transducer 82 shows the position of slide 56 on rods 46 and 48, while transducer 76 shows the vertical position of tip 72a and of needle 72.

Figure 3A:
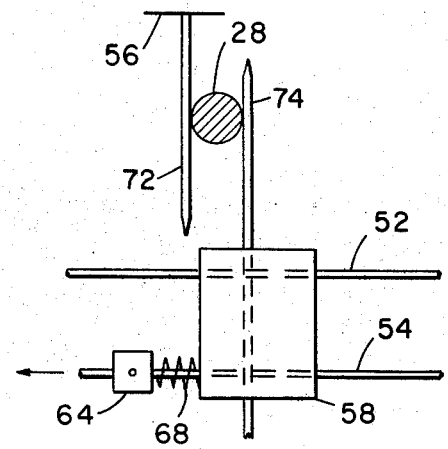
Figure 3B:
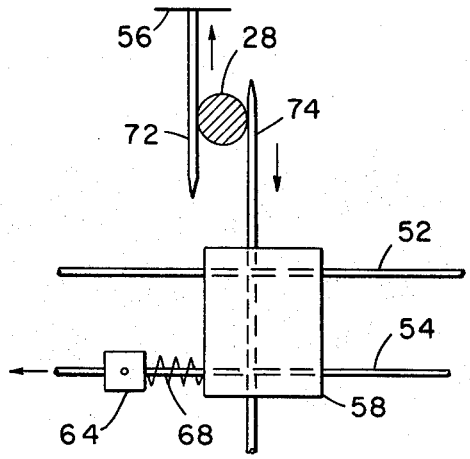
Figure 3C:
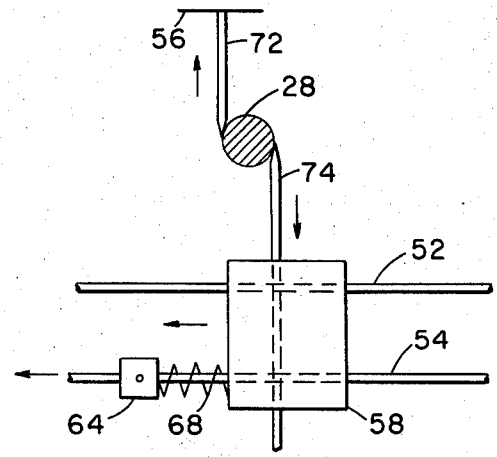
Figure 3D:
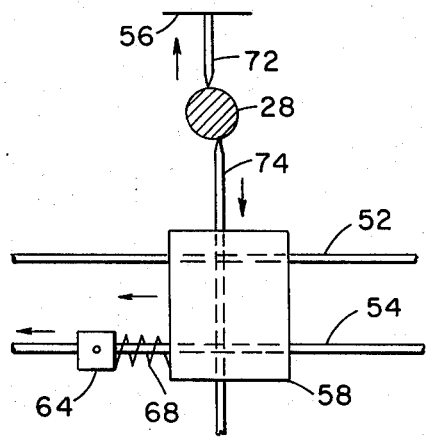
Figure 3E:
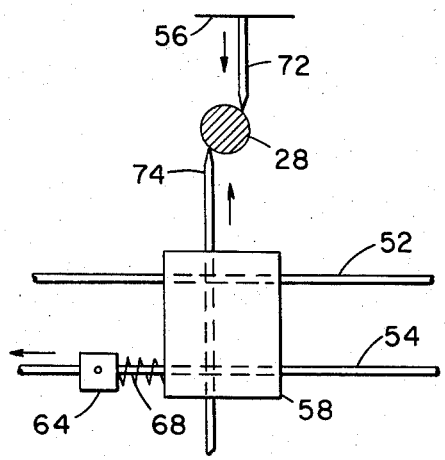
Figure 3F:
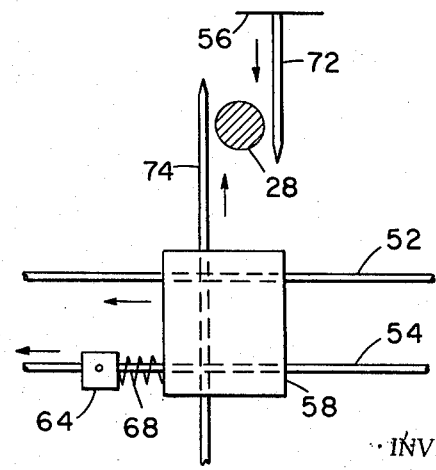

As seen in FIGS. 3a—3f, by an electromechanical arrangement to be described later, needles 72 and 74 are brought into contact with rod 28 by the movement of slides 56 and 58. When contact with rod 28 is made, as illustrated in FIG. 3a, then needles 72 and 74 are withdrawn as shown in FIGS. 3b and 3c until the tips thereof contact the outer circumference of rod 28 at points 180° apart along the axis perpendicular to the axes of needles 72 and 74, best shown in FIG. 3c. Then, as indicated by arrows, while needles 72 and 74 continue their retraction, slides 56 and 58 begin to move toward each other, so that the tips of needles 72 and 74 maintain continuous contact with the outer circumference of rod 28, as shown in FIGS. 3d and 3e. After reaching positions directly opposite by 180° that of the positions shown in FIG. 3c, needles 72 and 74 separate as shown in FIG. 3f. Then, carriage 32 is moved an incremental distance along track members 12 and 14 and the process is repeated, either by reversing the movement of needles 72 and 74, or returning them to their starting positions of FIG. 2. During the whole process, transducers 76, 78, 82, and 84 produce a signal reproducible on a display such as a strip chart and imperfections in the surface of rod 28 are thereby noted.

Figure 4:
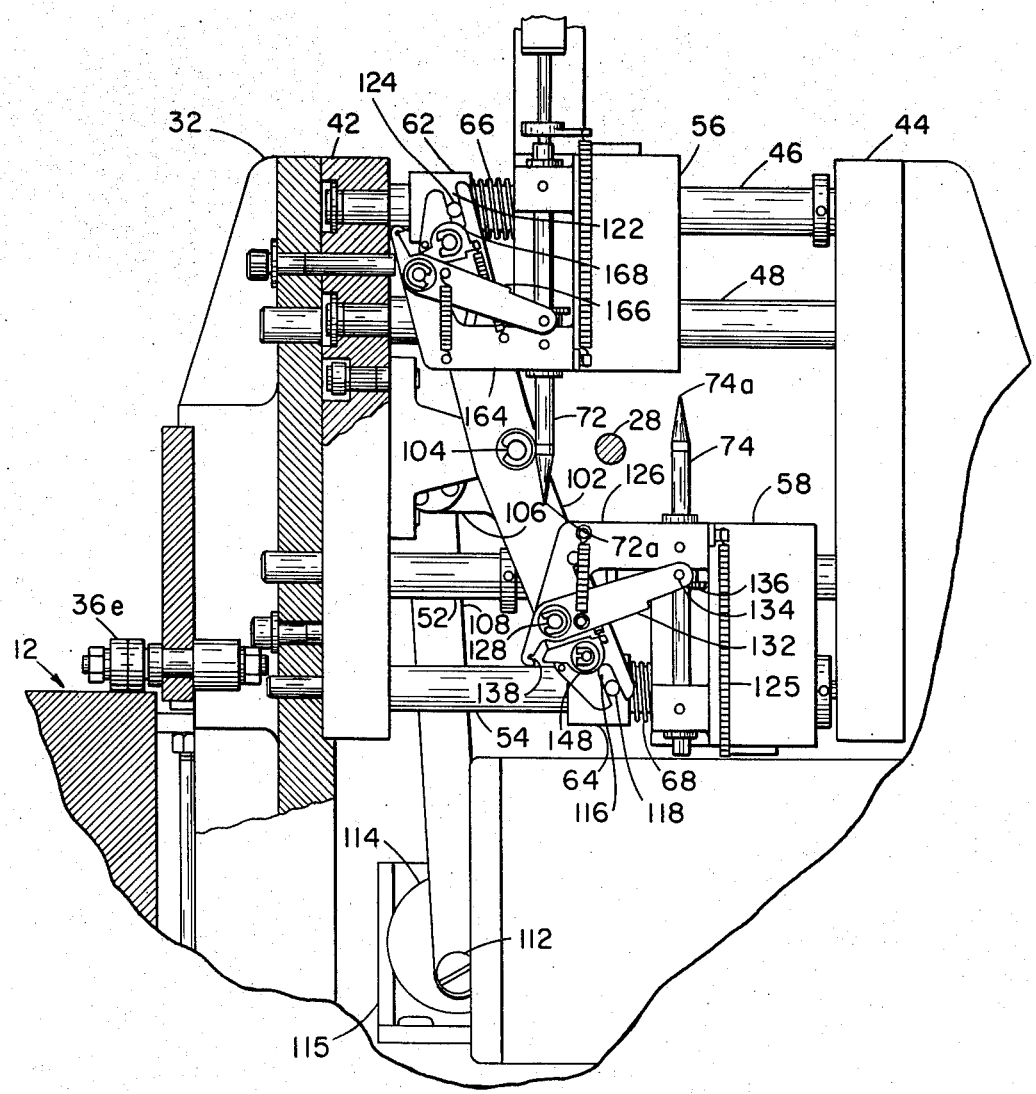
FIG. 4 is an elevation view in section through a portion of the carriage assembly of FIG. 1.
Figure 5:
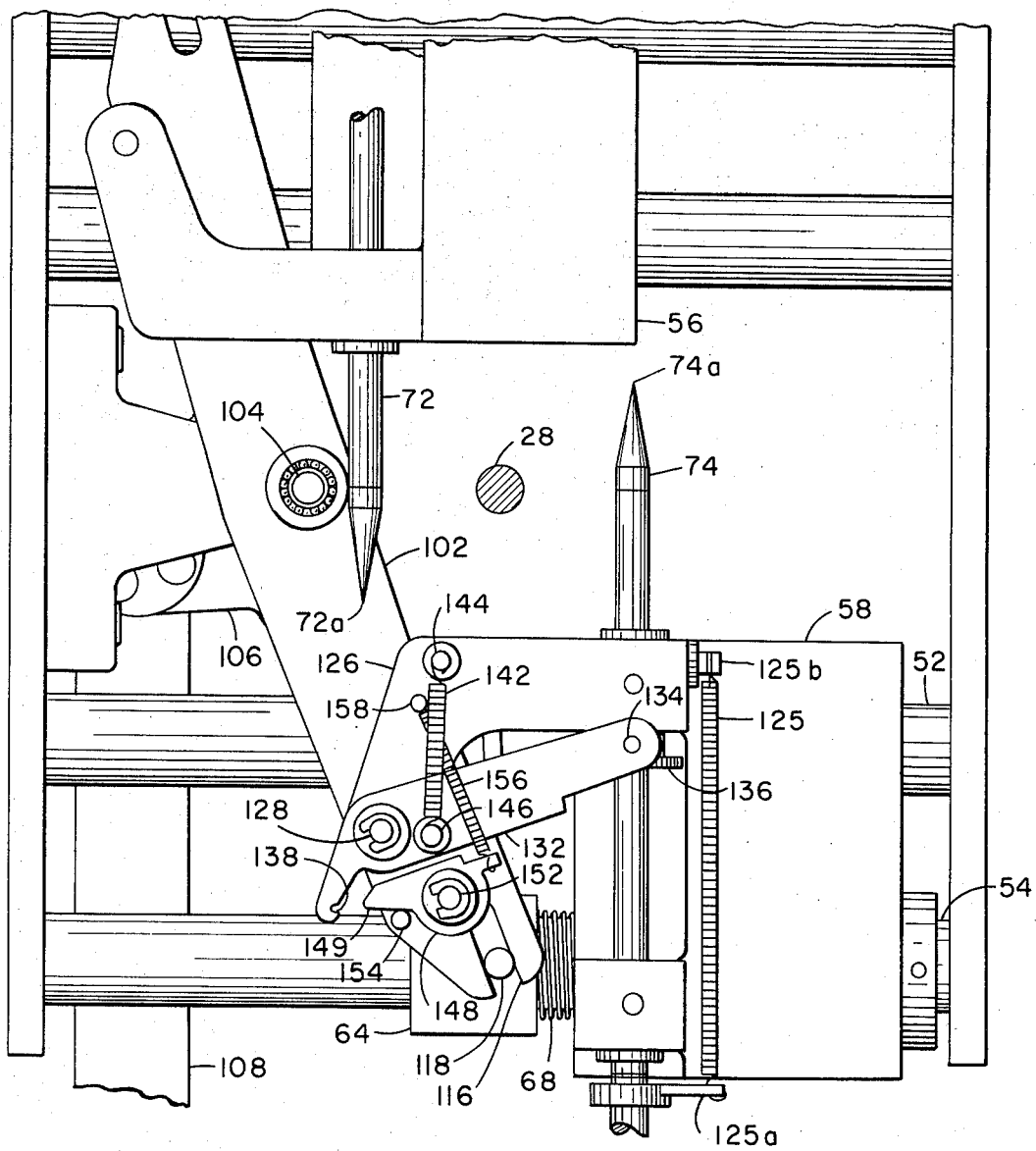
FIG. 5 illustrates a detail of the construction shown in FIG. 4.

For the mechanical details of the arrangement for moving needles 72 and 74 around the surface of rod 28, reference is made to FIGS. 4 and 5. With particular reference first to FIG. 4, it will be noted that slide 58 with needle 74 is interconnected with slide 56 and needle 72 by way of a swing arm 102. The latter is pivoted at its center on a shaft 104 and has an extension 106 to which is connected a drive link 108. The opposite end of the latter is connected by way of pin 112 to an eccentric 114 which when rotated by a motor 115 causes link 108 to reciprocate and swing arm 102 to swivel reciprocally about shaft 104. It will be seen from FIG. 4 that arm 102 is in its counterclockwise position, with needles 72 and 74 in their extreme positions and pin 112 at its lowermost position on eccentric 114. The latter rotates slowly in a clockwise direction, and as will be hereinafter described, from the point shown link 108 will be raised and swing arm 102 will be caused to rotate clockwise until pin 112 reaches its uppermost position whereafter the arm 102 will be reversed in its direction of movement.

The lower end of arm 102 has a slot 116 in which slides a pin 118 which extends from bushing 64. The upper end of arm 102 similarly has a slot 122 in which a pin 124 attached to bushing 62 slides. It is readily apparent that clockwise movement of arm 102 will cause bushing 64 to move to the left and bushing 62 to move in the opposite direction. Slides 56 and 58 tend to follow the movement of their respective bushings due to their interconnection by springs 66 and 68, the latter under tension and the former under compression. A spring 125 (see FIG. 5) connected between a holder 125a on needle 74 and a holder 125b on slide 58 biases needle 74 in an upward direction. Needle 72 is similarly biased downwardly.

Mounted on slide 58 is a leg-shaped plate arm 126 extending to overlap arm 102. A pin 128 located on the extremity of arm 126 away from slide 58 is the pivot for a lever 132 which at the other end has a pin 134 to engage a slot in sleeve 136 on pin 74 and on the opposite end has a noselike tip 138. Thus, clockwise rotation of lever 132 will cause needle 74 to retract or move down, and vice versa. A helical spring 142 connecting a pin 144 on arm 126 to a pin 146 on lever 132 biases the latter in a counterclockwise direction about its pivot point on pin 128.

A lever 148 having an extension 149 pivots about a pin 152 on swing arm 102. Lever 148 is biased with extension 149 against a stop 154 on swing arm 102 by a helical spring 156 connected at one end to lever 148 and at its opposite end to a pin 158 on arm 126. Thus, as swing arm 102 is rotated clockwise by link 108, bushing 64 is moved to the left causing tension in spring 68 which causes slide 58 to follow. Needle 74 eventually comes into contact with rod 28, as shown in FIG. 3a, at which point bushing 64 begins to separate in distance from its slide 58. As this distance increases, the distance between tip 138 of lever 132 and extension 149 of lever 148 begins to close. Soon they come in contact with each other and levers 132 and 148 both begin to rotate clockwise. This causes a gradually increasing force vector perpendicular to the axis of shafts 52 and 54 and a diminishing force vector parallel to these shafts to reduce the pulling force acting on slide 58. As lever 132 rotates, pin 134 pushes sleeve 136 down thereby moving needle 74 down against the baising effect of spring 125.

When tip 74a contacts the point on rod 28 shown in FIG. 3c, the pull of spring 68 will move slide 58 to the left as needle 74 continues to retract. When needle 74 reaches the position shown in FIG. 3d, levers 148 and 132 will reverse their rotation as needle 74 is moved upward and lever 148 will come to rest on stop 154. During this operation swing arm 102 rotates about 40°. During its rotation in the opposite direction the cycle will reverse itself, tip 74a of needle 74 again retracing the surface of rod 28. Upper needle 72 is actuated with the identical mechanism (see FIG. 4) consisting of arm 164 and levers 166 and 168.

In the operation of the apparatus described, rod 28 is mounted securely by clamps 24 and 26 and carriage 32 is moved to one end of the apparatus. Swing arm 102, beginning in its initial position shown in FIG. 2 and FIG. 4, is rotated very slowly, transducers 76, 78, 82 and 84 producing information on the positions of needles 72 and 74, which information is displayed as already noted. When the needles have made a complete pass, that is, passing from FIGS. 3a to 3f, carriage 32 is moved a short distance, and the pass is reversed. This continues for the whole length of rod 28, giving a complete picture in graphical form of the diameter, ovality, bow, and surface contour of rod 28.

The degree of accuracy and completeness of information received is greater than any arrangement heretofore used, and furthermore, these results are obtained with apparatus relatively simple to construct and operate.

It is thus seen that there has been provided a unique arrangement for determining the surface conditions of a rod. While only a preferred embodiment has been described, it is understood that many variations thereof are possible without departing from the principles of this invention as defined in the following claims.

I claim:

1. A forced peripheral system for measuring the surface shape of cylindrical elements comprising:
   a. means, provided at spaced locations along the length of said element, for supporting said element with its axis in a first direction;
   b. first and second needlelike probe means having free ends extending in opposed directions;
   c. means for movably supporting each of said probe means with their axes parallel to a plane perpendicular to said first direction, said probes means having an initial position with each of the probes means being disposed adjacent opposite points on the periphery of said element in an overlapping relationship, including means for moving each of said probe means laterally of its axis in said plane toward said element disposed therebetween, and interconnecting means for independently axially retracting each of said probe means, in response to the contacting of each of said probe means with the said adjacent points, by amounts necessary to permit continued movement in said lateral directions and for subsequently independently axially advancing each of said probe means for maintaining a portion of each of said probe means in contact with the periphery of said element such that each probe means is capable of spanning a separate 180° peripheral portion of said element;
   d. means to produce information as to the path traced out by each of said probe means thereby determining the contour of said element in said plane of probe means movement.

2. The apparatus of claim 1 in which said interconnecting means includes a swing arm engaged at opposite ends thereof with each of said probe means, and means for reciprocally pivoting said swing arm to cause forward and reverse scanning by said probe means.

3. The apparatus of claim 2 in which each of said probe means is a needle slideably mounted on a slide, said interconnecting means including a spring means for each slide, each said slide being moved by said swing arm through its spring means to accommodate irregular movements of said needle due to irregularities in the surface of said element.

4. The apparatus of claim 3 in which at least one spring-biased lever is utilized for each needle to effect axial movement of each needle during the course of transverse movement.